Aug. 5, 1930.  F. FRANZ  1,772,419
MACHINE FOR MAKING LANTERN PINIONS
Filed Feb. 28, 1927   7 Sheets-Sheet 1

Aug. 5, 1930. F. FRANZ 1,772,419
MACHINE FOR MAKING LANTERN PINIONS
Filed Feb. 28, 1927 7 Sheets-Sheet 7

Patented Aug. 5, 1930

1,772,419

UNITED STATES PATENT OFFICE

FREDERICK FRANZ, OF HAMDEN, CONNECTICUT, ASSIGNOR TO THE NEW HAVEN CLOCK CO., OF NEW HAVEN, CONNECTICUT, A CORPORATION

MACHINE FOR MAKING LANTERN PINIONS

Application filed February 28, 1927. Serial No. 171,591.

This invention relates to an improvement in machines for making lantern-pinions of the type commonly employed in clocks, and its object is to provide an accurate and dependable machine for automatically inserting the so-called leaves into lantern-pinions.

A further object of this invention is to provide a machine which will automatically drill the collets of lantern-pinions for the reception of the leaves, automatically insert the leaves, and automatically secure the said leaves in place.

With these objects in view, my invention consists in a machine for making lantern-pinions having the construction and combinations of parts as will hereinafter be described and particularly recited in the claims.

In the accompanying drawings:

Fig. 1ª is a top or plan view of the left-hand or pinion-drilling portion of my improved machine for making lantern-pinions;

Fig. 1ᵇ is a corresponding view of the right-hand or pinion-filling portion thereof;

Fig. 3 is a view thereof in end elevation;

Fig. 15 is a corresponding view, after the blank has been drilled;

Fig. 16 is a corresponding view of one of the pointed leaves;

Fig. 18 is an enlarged broken detail sectional view of the forward end of the carriage, the transfer-slide, and staking-block, together with the drilled pinion-blank and its supports.

Figures 2, 14:
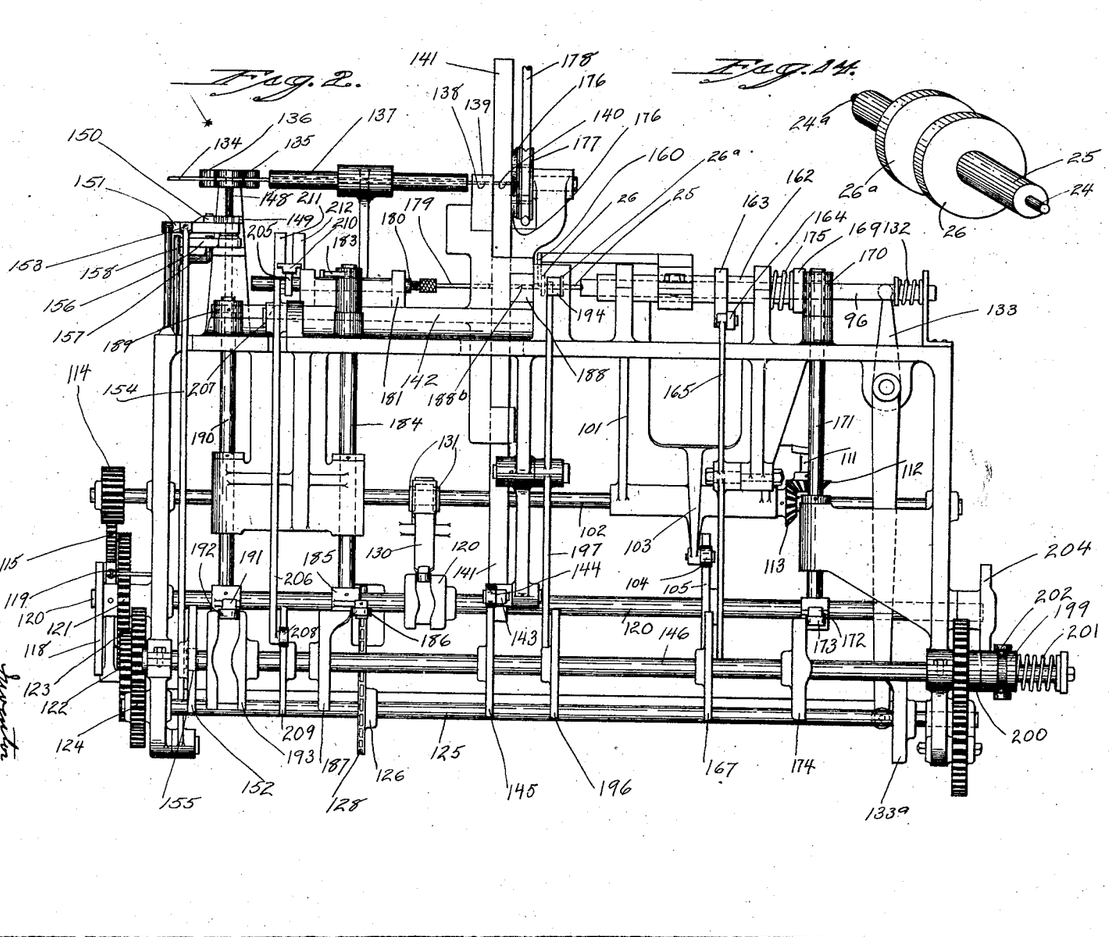
Fig. 2 is a view of my improved machine in right-hand-side elevation.
Fig. 14 is a perspective view of a lantern-pinion blank as introduced into my improved machine.
Figures 2, 8:
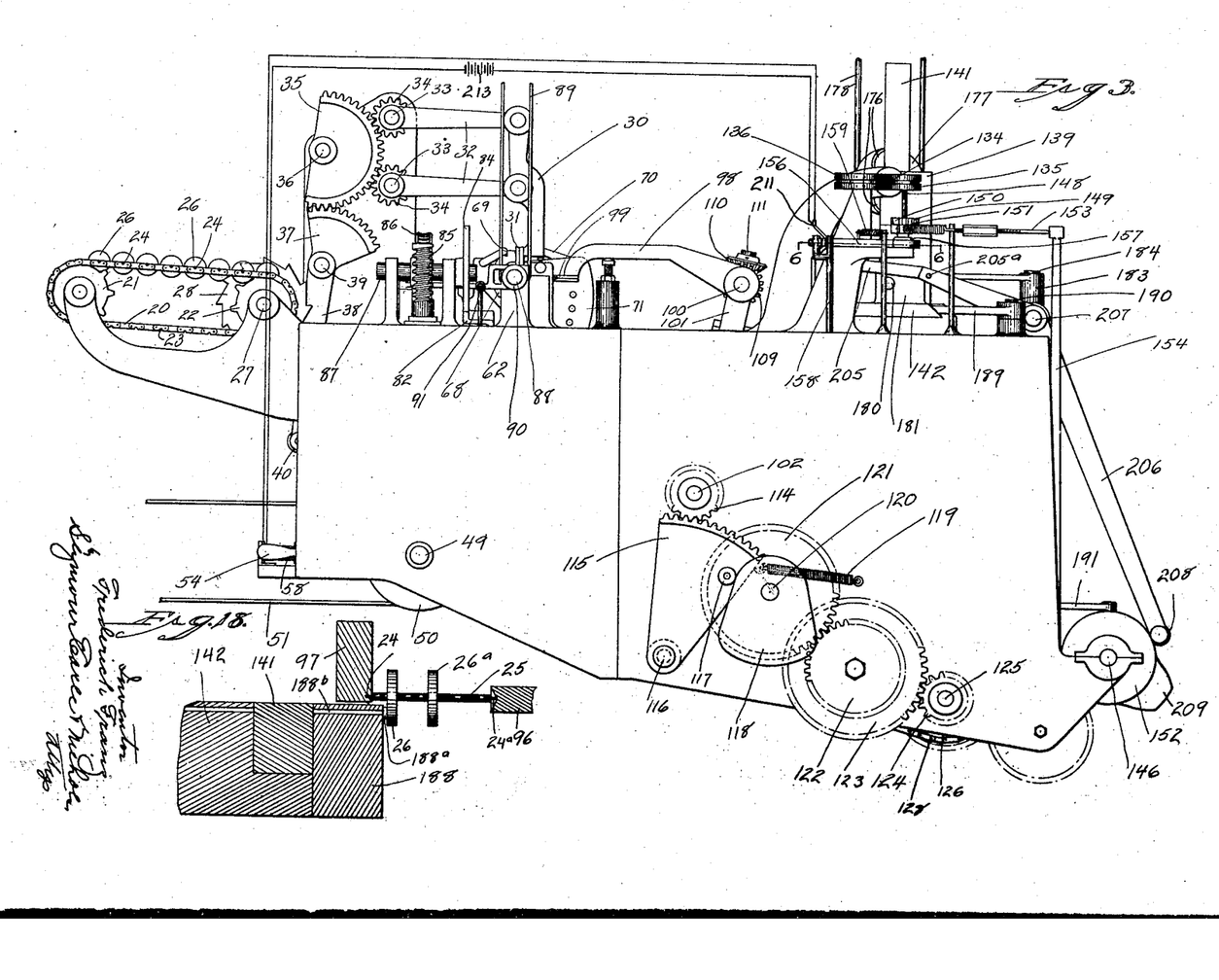
Fig. 8 is an enlarged broken perspective view of the indexing-finger.

In carrying out my invention, as herein shown, I employ a conveyor consisting of two corresponding parallel chains 20, each of which passes over an outer or idler sprocket 21 and an inner or driving sprocket 22, and is formed upon its outer edge with a series of notches 23 (Fig. 3) provided for the reception of the trunnions 24 and 24ª at the opposite ends of a shaft 25 of the lantern-pinion blank, which latter also comprises two corresponding collets 26 and 26ª, as shown in Fig. 14.

Figures 1A, 8, 15, 16:
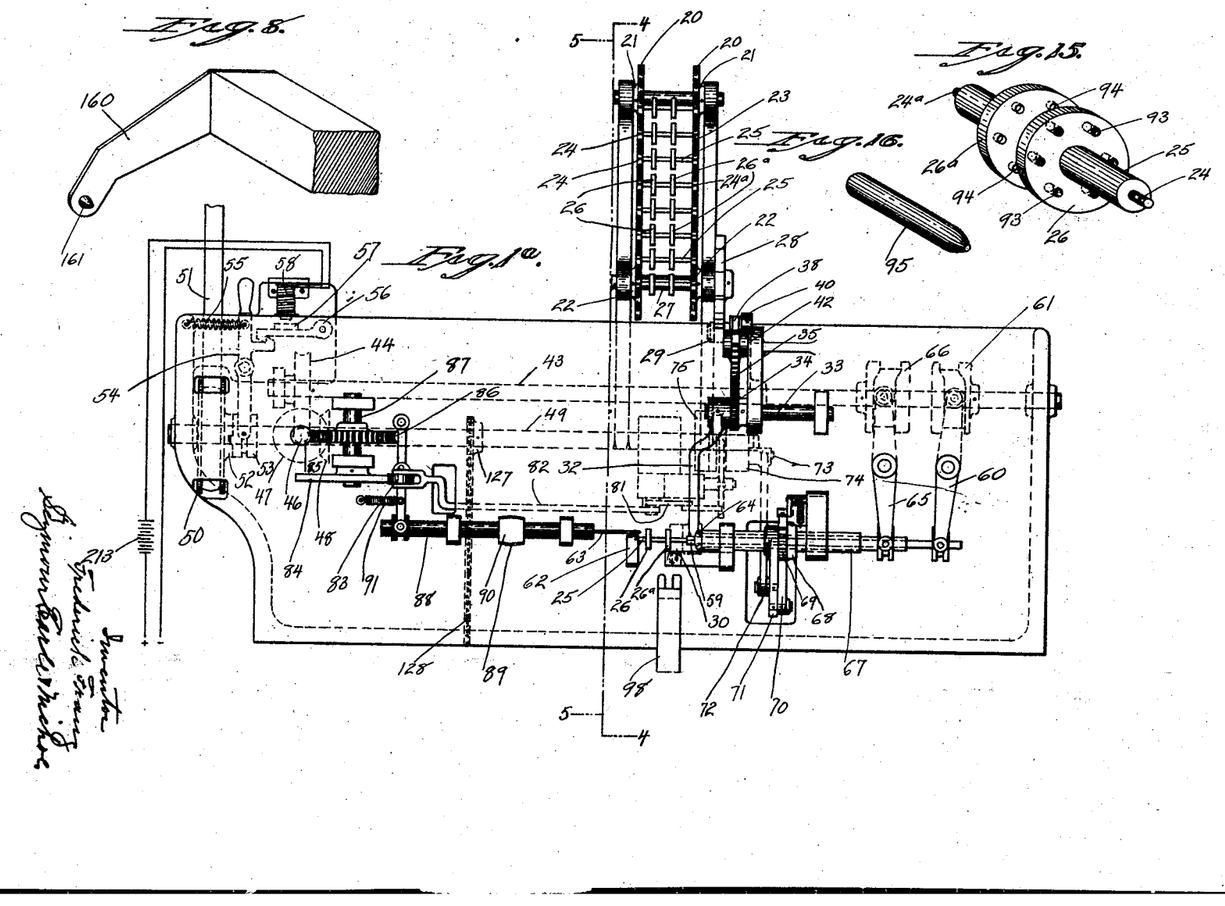

Lantern-pinion blanks of the character just described are placed on the conveyor-chains 20 aforesaid, either by hand or by any suitable automatic device. The driving-sprockets 22 of both of the conveyor-chains are mounted upon a short shaft 27, which carries at one end a ratchet-wheel 28 engaged by a pawl 29, so that the conveyor-chains will be intermittently moved in proper timing with a feed-arm 30. The feed-arm just mentioned is provided at its lower end with a pair of yielding pick-up fingers 31, adapted to snap over the shaft 25 of the lantern-pinion blank, and is carried at the outer end of two parallel arms 32, which are pivoted to it and which, at their inner ends, are mounted upon studs 33 carrying pinions 34, both of which latter are meshed into by an intermediate gear-segment 35 swinging upon a stud 36 and in turn actuated by a gear-segment 37 formed at the upper end of a lever 38 which swings upon a pivot 39 and carries the pawl 29 aforesaid. At its lower end, the lever 38 is provided with a roller 40, which, by means of a helical spring 41, is maintained in contact with a feed-cam 42 mounted upon a shaft 43, which is also provided with a worm-wheel 44 meshing into a worm 45 formed on a vertical shaft 46, which latter carries at its lower end a miter-pinion 47 meshing into a corresponding pinion 48 upon the main-drive-shaft 49. Near one of its ends the main-drive shaft 49 has loosely mounted upon it a drive-pulley 50, receiving a belt 51 and having a clutch-member 52 formed upon its inner face. The clutch-member 52 is adapted to co-act with a complementary clutch-member 53 feathered upon the main-drive-shaft 49 aforesaid, upon which it has limited sliding movement under the control of a clutch-lever 54, which, as shown in Fig. 1a, is maintained in position to engage the clutch-members 52 and 53 against the counter-urge of a spring 55 by means of a latch 56. The latch 56 just described carries an armature 57 adapted to be moved by an electro-magnet 58 for the purpose of stopping the drive-shaft 49, as will be hereinafter described.

Figure 4:
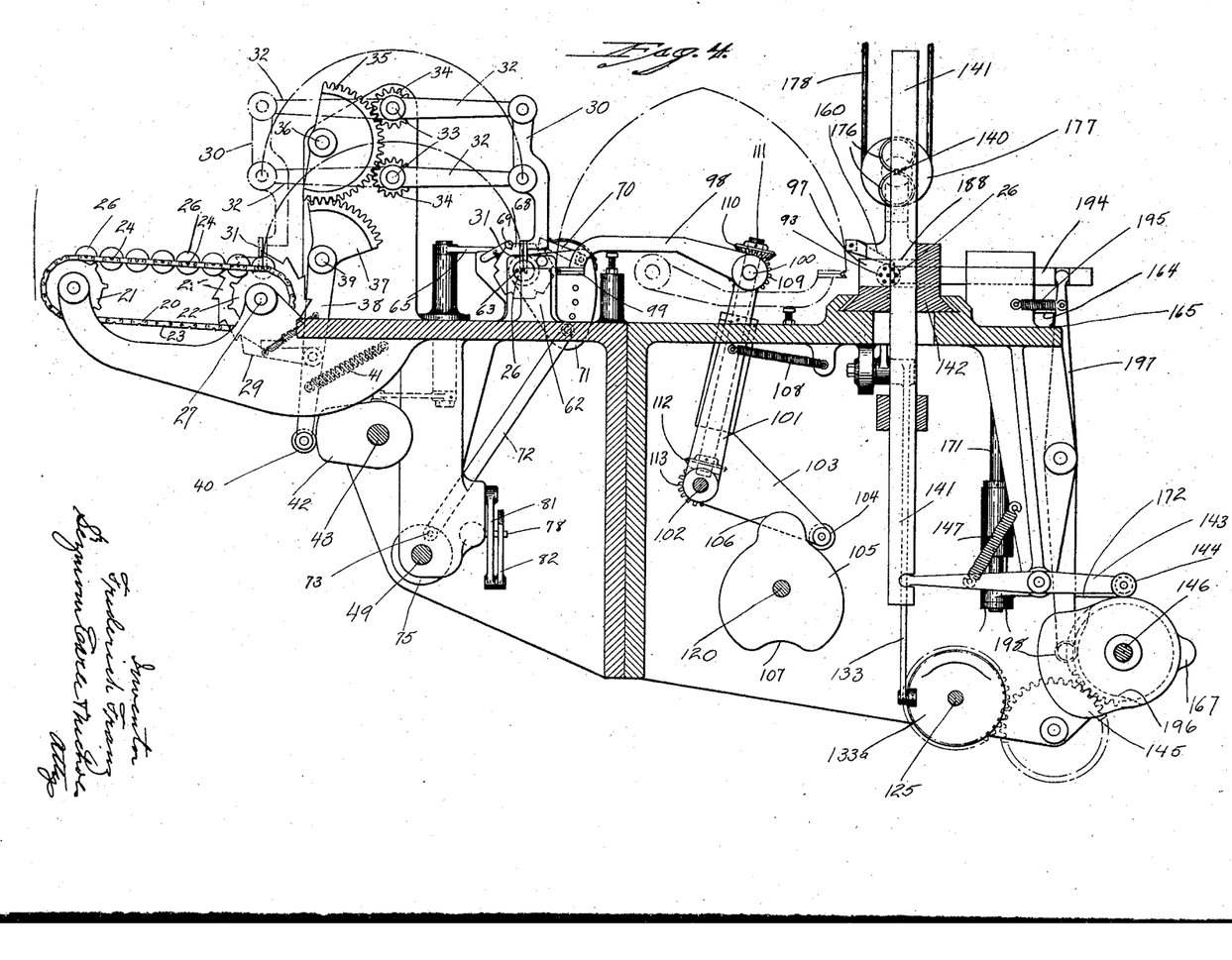
Fig. 4 is a transverse sectional view on the line 4—4 of Figs. 1ª and 1ᵇ, looking in the direction indicated.

The feed-arm 30 moves through the path indicated in Fig. 4 and presents a lantern-pinion blank, such as shown in Fig. 14, into position to be gripped by a chuck of ordinary construction and which, as shown, consists of an inner split gripping-tube 59 adapted to receive the trunnion 24a of the shaft 25 of the lantern-pinion blank, and has slight endwise movement imparted to it by a lever 60 and cam 61, which latter is mounted upon the shaft 43 previously described. This slight endwise movement of the gripping-tube 59 serves to cause it to move over the adjacent trunnion 24a of the shaft 25 when the same has been placed in line with it by the feed-arm 30, and, at the same time, to move the opposite trunnion 24 into a socket formed in a centering-post 62 in which it is adapted to have step-by-step rotation. For the purpose of firmly gripping the shaft 25, so that the pinion-blank may be properly indexed with respect to a drill 63, the tube 59 is compressed by means of a clamping-sleeve 64, which has for the purpose, slight endwise movement imparted to it by means of a lever 65 and cam 66.

For the purpose of indexing the pinion-blank with respect to the drill 63, the rotary housing-tube 67 of the chuck is provided with an indexing ratchet-wheel 68 having notches 69 corresponding in number to the number of holes which it is intended to drill in the collets 26 and 26a of the pinion-blanks. To impart a partial rotation to the pinion-blank after each drilling operation, the indexing ratchet-wheel 68 is engaged by a pawl 70 carried by a rocking-plate 71 functioning in effect as a bell-crank lever and actuated by a connecting-rod 72 pivoted at its lower end to an eccentric pin 73 mounted upon one of the disk-like members 74 of what is commonly known as a one-revolution clutch. The clutch-member 74 is loosely mounted upon the end of the main drive-shaft 49 and is periodically rotated for indexing the lantern-pinion blank by a continuously-rotating complementary disk-like member 75 to which it is periodically coupled by means of a coupling-pin 76 adapted to enter a socket 77 in the clutch-member 75. For the purpose or normally holding the coupling-pin 76 out of engagement with the socket 77, I employ a rocking-latch 78 having a beveled end 79 co-acting in the usual way with a notch 80 in the coupling-pin 76. The latch 78 is rocked to disengage it from the notch 80 aforesaid by means of a bell-crank-lever 81 pivoted to the under-side of the machine-frame and actuated by a link 82 which carries at its opposite end a roller 83 engaging a drill-cam 84 having a plurality of lobes corresponding in number to the number of holes it is intended to drill in each pinion blank, and driven by the main-drive-shaft 49 through the intermediary of the vertical shaft 46, a worm 85, worm-wheel 86, and shaft 87. The link 82 is coupled to an axially-movable drill-spindle 88 which carries at its opposite end the drill 63 aforesaid and is rotated by means of a belt 89 and pulley 90. A spring 91 maintains the roller 83 in contact with the cam 84 and acts to withdraw the drill from the blank after the same has been advanced into it by the cam 84. This withdrawing movement of the drill 63 is accompanied by a movement of the link 82 in the same direction, with the result that the latch 78 is rocked to permit the coupling-pin 76 to be snapped into the socket 77 by its spring 92, so that the ratchet-wheel 68 and hence the lantern-pinion blank will be given one partial revolution. It is to be noted, in this connection, that the latch 78 immediately returns to its normal position, so as to withdraw the pin 76 from the socket 77 when it again comes around, whereby the clutch-member 74 is limited to but one revolution at a time.

The mechanism thus far described operates upon a lantern-pinion blank such as shown in Fig. 14, so as to drill a series of holes 93 completely through one of its collets 26 and correspondingly-spaced series of holes 94 extending but part way through the other collet 26a, as shown in Fig. 15.

The next step in producing the completed lantern-pinion is to insert the leaves 95 into the holes 93 and 94. For this purpose the previously-drilled lantern-pinion blank is transferred from the chuck-tube 59 to a position between an axially-movable centering-spindle 96 and centering-post 97 by means of a transfer-arm 98, which latter partakes of three distinct movements,—i. e., lateral, endwise, and swinging, as will be hereinafter described.

The outer end of the transfer-arm carries spring-fingers 99 and is mounted upon a short shaft 100 journalled in the upper end of a rocking-frame 101 mounted at its lower end for oscillatory and reciprocating movement upon a rock-shaft 102 upon which it is rocked through its integral arm 103, which carries a roller 104 held in engagement with the periphery of a cam 105 having a rise 106 and a drop 107, by means of a spring 108. These last described parts act to impart endwise movement to the transfer-arm for the purpose of engaging its fingers 99 with the pinion-shaft 25 and subsequently disengaging it therefrom.

Figure 1B:
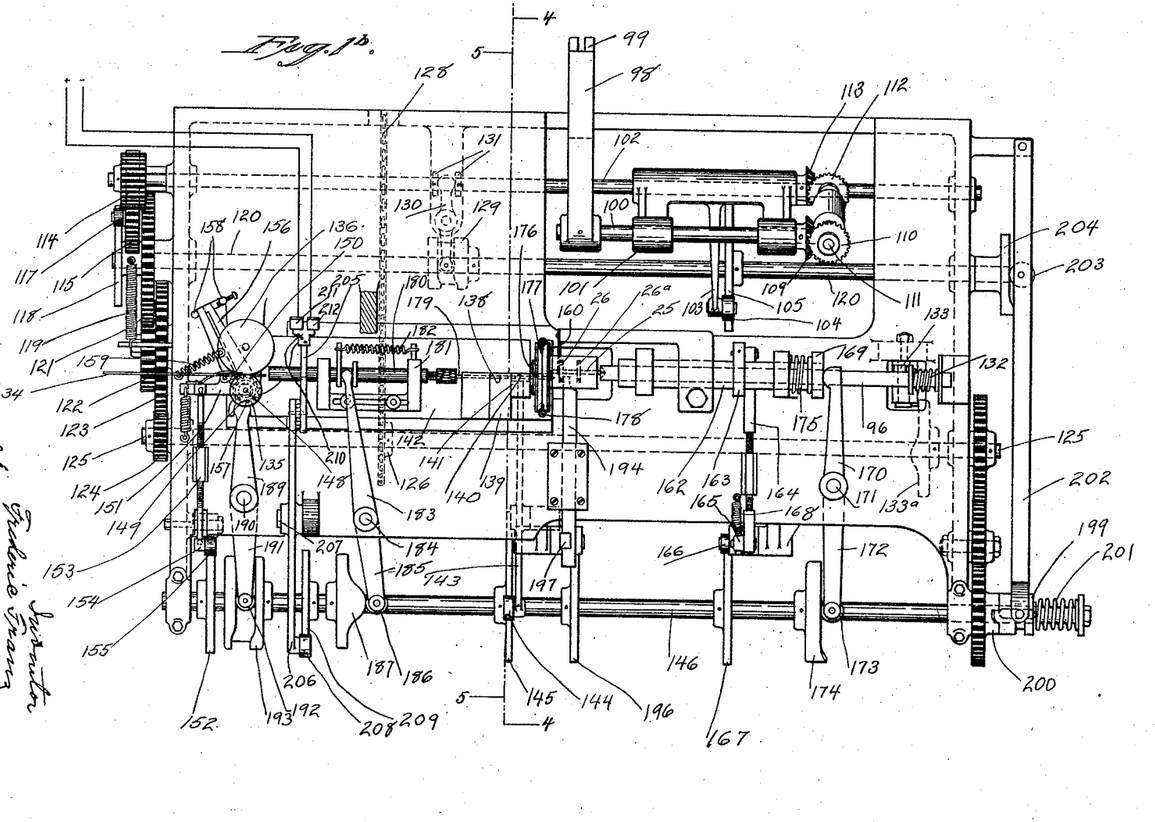

In addition to its endwise movement, which results from the rocking movement of the frame 101, the transfer-arm 98 has an arcuate movement of approximately 180° imparted to it by providing its shaft 100 with a miter-pinion 109 meshing into a corresponding pinion 110 at the upper end of a short shaft 111 journaled in one end of the rocking-frame 101, as clearly shown in Fig. 1$^b$. At its lower end the shaft 111 carries a miter-pinion 112 meshing into a corresponding pinion 113 secured to the rock-shaft 102 aforesaid. This shaft 102 is periodically oscillated as required to effect the arcuate movement of the transfer-arm by its provision at one end with a pinion 114 meshing into a gear-segment 115 rocking upon a stud 116 and provided with a roller 117, which latter is held in engagement with a cam 118 by means of a spring 119. The cam 118, just referred to, is mounted upon one end of a shaft 120, which also carries the cam 105 aforesaid, so that the actions of the two cams in effecting the arcuate and endwise movements respectively of the transfer-arm 98 are properly synchronized. The shaft 120 is rotated, as shown by a train of gears 121, 122, 123 and 124, deriving their motion from a secondary drive-shaft 125, which, in turn, is driven from the main drive-shaft 49 by means of sprockets 126 and 127 and a chain 128.

Figures 5, 17:
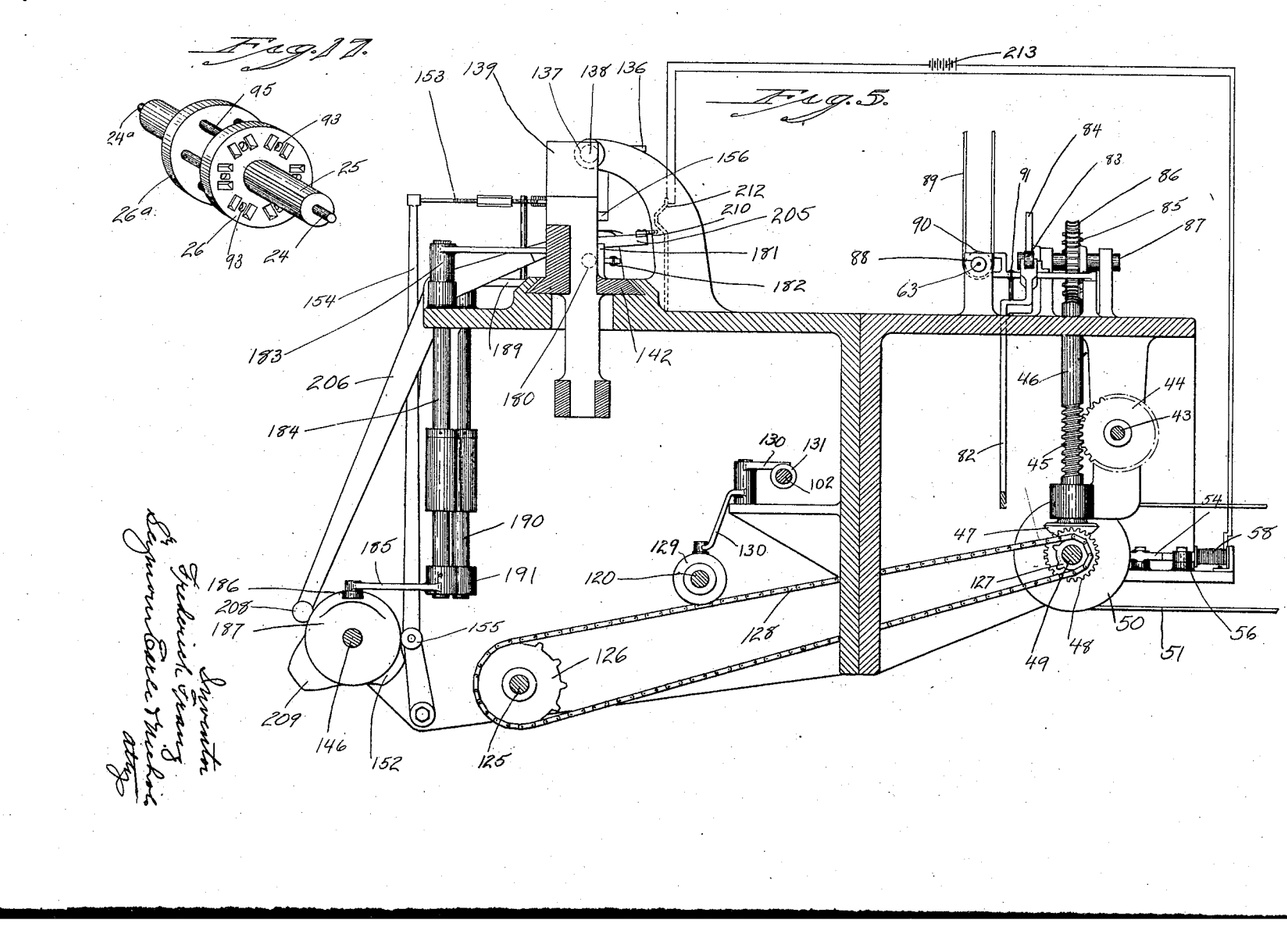
Fig. 5 is a corresponding view on the line 5—5 of Figs. 1ª and 1ᵇ, looking in the opposite direction as indicated.
Fig. 17 is a corresponding view, showing the completed lantern-pinion as produced in my improved machine.

In addition to the endwise and arcuate movements just above described the transfer-arm also partakes of a lateral movement, which is imparted to it for disengaging the trunnion of the lantern-pinion blank from the centering-post 62, after its release by the gripping-tube 59, and to ultimately engage the said trunnion with the centering-post 97. This lateral movement of the transfer-arm is effected by means of a cam 129 carried by the cam-shaft 120 aforesaid, and acting through a lever 130 and collars 131, as clearly shown in Fig. 1$^b$ and Fig. 5.

By means of the mechanism just described, the drilled pinion-blank is transferred from the chuck-tube 59 and centering-post 62 to a position in line with and between the centering-spindle 96 and the centering-post 97. When this has been accomplished, the cam 129 acts to move the transfer-arm 98 laterally, so as to enter the trunnion 24 of the pinion-shaft 25 into an appropriate socket on the centering-post 97. Concurrently with this movement, the centering-spindle 96 is moved axially, so as to yieldingly hold the drilled pinion-blank in place, by means of a spring 132, the action of which is controlled by a lever 133 and cam 133$^a$, which latter is mounted upon the secondary drive-shaft 125 aforesaid. As soon as the pinion-blank is securely held, as just described, the transfer-arm 98 is retired endwise away from it by the cam 105, and at or near the completion of this movement, the arm is swung with the shaft 100 as a center toward the chuck-tube 59 and centering-post 62.

The drilled pinion-blank is now ready to receive the leaves 92, which are pointed, cut and inserted in the following manner:

A length of wire 134 of suitable diameter to form the leaves is passed between a feed-roll 135 and an idler-roll 136 (Fig. 1$^b$), through a guide-tube 137 and thence through a passage 138 in a cut-off block 139 and through a passage 140 in a combined leaf cut-off and transfer-slide 141.

The combined cut-off and transfer-slide is mounted for vertical reciprocation in a carriage 142 for the purpose as will hereinafter appear and is actuated by means of a lever 143 having a roller 144 at its outer end, which latter is maintained in contact with a cam 145 mounted upon an intermittently-driven cam-shaft 146 by means of a spring 147.

For the step-by-step rotation of the feed-roll 135, its shaft 148 is provided with a ratchet-wheel 149 which is engaged by a pawl 150 carried by a swinging-arm 151 actuated by a cam 152 on the shaft 146, by means of a link 153, lever 154, and roller 155.

The step-by-step rotation of the feed-roll 135 just described is frictionally resisted by a yielding friction-arm 156 embracing a friction-disk 157 mounted upon the shaft 148. This friction-arm is permitted a limited forward swinging movement between two stops 158 and against the tension of a retracting-spring 159, which latter serves, as will hereinafter appear, to cause a slight reverse rotation of the feed-roll after each forward step is imparted to it by the pawl 150.

For indexing the drilled pinion-blank for the purpose of successively installing the leaves therein, while it is held between the centering-spindle 96 and centering-post 97, I provide an oscillating yielding indexing-arm 160 having a finger 161 adapted to successively enter the holes 93 in the collets 26 of the drilled pinion-blank, and mounted upon an oscillating and reciprocating indexing-sleeve 162 through which the centering-spindle 96 passes. The sleeve 162 is oscillated by means of an arm 163 depending from it and which is connected by an adjustable pitman 164 to the upper end of a lever 165 carrying at its lower end a roller 166, which latter is maintained in contact with an indexing-cam 167 by means of a spring 168.

For governing the entry of the finger 161 into and retraction from the holes 93 in the collet 26 of the drilled pinion-blank, the oscillating indexing sleeve 162 is provided with a collar 169 engaged by a lever-arm 170 at the upper end of a vertical rock-shaft 171 which carries at its lower end an outwardly-extending arm 172, which latter is provided at its outer end with a roller 173, engaging a cam 174 on the intermittently-driven cam-shaft 146. A spring 175 encircling the sleeve 162 and bearing against one side of its collar 169 exerts a constant effort to move the sleeve so as to engage the finger 161 with the holes 93 in the collet 26 of the drilled pinion-blank and incidentally also acts to maintain the roller 173 in contact with the cam 174.

It may be noted in this connection that owing to the yielding character of the indexing-arm 160, its finger 161 may engage the outer face of the collet 26 in the event that one of the holes 93 is not initially in registration with it, without displacing the drilled pinion-blank and without damaging the finger. Subsequently, during its indexing movement, the finger will search out and snap into one of the holes and move it into proper position to receive a leaf 92.

The feed-roll 135 acts to move the length of wire 134, so that its forward end is momentarily inserted between two beveled pointing-rolls 176 eccentrically mounted for rotation upon a high-speed pulley 177 which is driven by a belt 178. The pointing of the end of the wire having been accomplished, the retracting-spring 159 acts to reversely rotate the feed-roll a slight distance and this withdraws the end of the wire from the pointing-rolls.

The end of the wire having been pointed, as described, the combined leaf cut-off and transfer-slide 141 is drawn downward by the cam 145, with the effect of cutting off, from the forward pointed end of the wire, a piece sufficiently long to form a pinion-leaf 92, which is now located within the passage 140 of the slide. The continued downward movement of the slide serves to align the passage 140 and leaf 92 with one pair of the previously-indexed holes 93 and 94 in the collets 26 of the drilled pinion-blank.

For the purpose of inserting the leaves into the pinion-blank, I employ a push-pin 179 mounted in the forward end of a reciprocating push-rod 180. The push-rod is mounted in a bracket 181 upstanding from the carriage 142 before mentioned, and is moved forward by a spring 182 and retracted by means of a lever 183, vertical rock-shaft 184, lever 185, which latter carries a roller 186 at its outer end and a cam 187.

Figures 6, 7, 9, 10, 11, 12, 13:
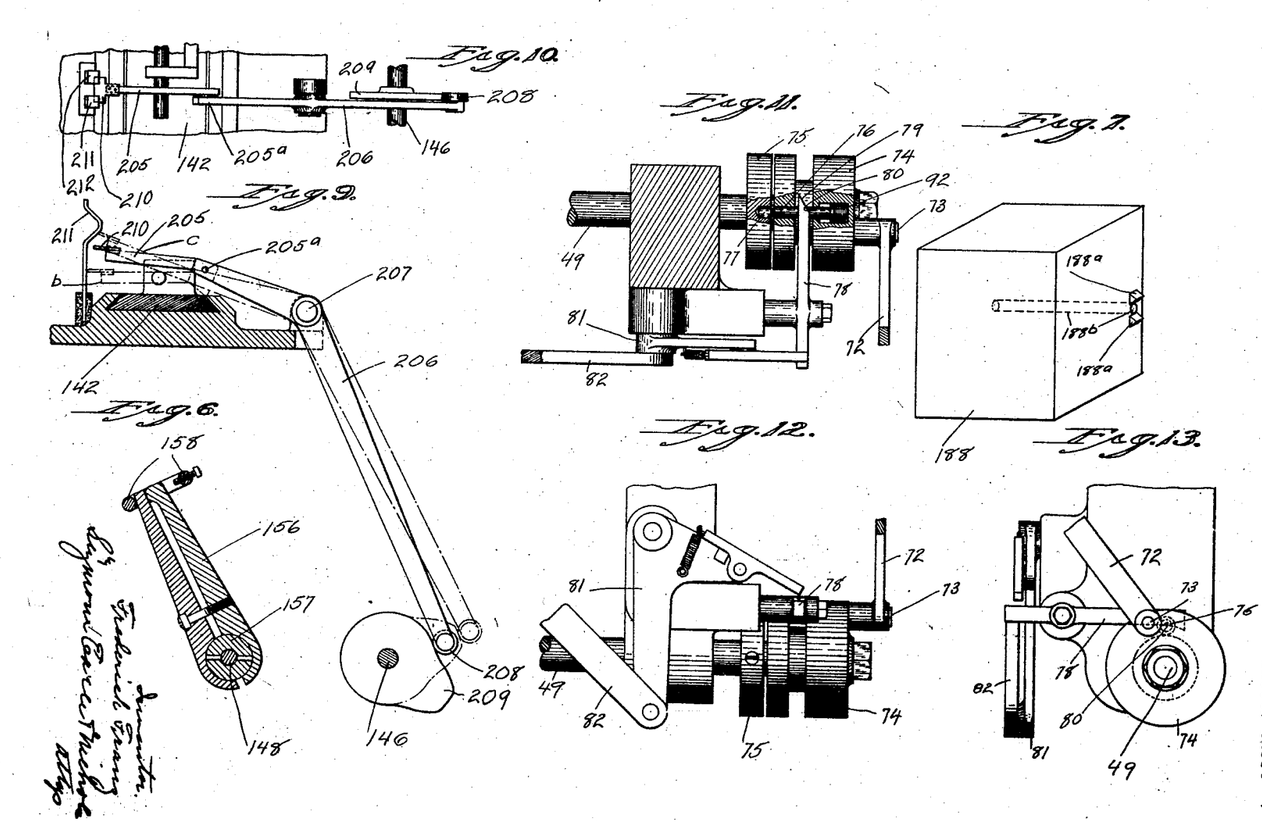
Fig. 6 is an enlarged detail sectional view on the line 6—6 of Fig. 3.
Fig. 7 is an enlarged broken perspective view of the staking-block, showing the staking-points thereon.
Fig. 9 is an enlarged broken detail sectional view showing the testing-arm and contiguous parts.
Fig. 10 is a top or plan view thereof.
Fig. 11 is a top or plan view on an enlarged scale of the one-revolution clutch-mechanism which effects the indexing of the pinion-blank for the drilling operation.
Fig. 12 is a side view thereof.
Fig. 13 is an end view thereof.

For the purpose of holding the leaves in place in the pinion, I provide the forward face of the carriage 142 with a staking-block 188 having two staking-prongs 188ª located on opposite sides of its passage 188ᵇ (Fig. 7). After the insertion of each leaf, as described, the reciprocating-carriage 142 is moved forward, so as to cause its staking-prongs 188 to partly close the outer end of the hole 93 into which the leaf has just been inserted, as clearly shown in Fig. 17. This forward movement of the carriage 142 is effected by means of a lever 189, vertical rock-shaft 190, lever 191, which latter carries a roller 192 at its outer end for co-action with a cam 193 on the cam-shaft 146.

To back up the collet of the pinion-blank while it is being staked, I provide an anvil-bar 194 which is periodically moved into position back of the collet by a spring 195, whose action is governed by a cam 196 through the intermediary of a lever 197 and roller 198.

In order to temporarily halt the action of the wire-feeding, leaf cut-off, leaf-inserting and staking mechanisms after they have completed a lantern-pinion and while the transfer-arm is transferring another drilled pinion-blank from the gripping-tube 59 to a position between the centering-spindle 96 and centering-post 97, I provide the cam-shaft 146 with a clutch-member 199, which is feathered upon it. This clutch-member 199 is normally held in engagement with its complementary clutch-member 200 by means of a spring 201 and is periodically disengaged therefrom by a lever 202 having a roller 203, which latter is engaged with a cam 204 on the shaft 120 aforesaid.

To prevent damage to the mechanism, should a leaf fail to be properly entered into the drilled pinion-blank for any reason such, for instance, as faulty indexing, an improperly long leaf, or the failure of the drill to properly drill the collets, I employ an automatic mechanism for stopping the machine. This stopping mechanism consists of a testing-arm 205 pivotally mounted, by means of a stud 205ª, upon the upper end of a bell-crank-lever 206, which latter is pivoted upon a stud 207 and carries, at its lower end, a roller 208, which engages with an actuating-cam 209 on the shaft 146. The testing-arm 205 aforesaid pivots upon the outer end of the bell-crank-lever 206 when occasion requires, but is normally held by friction so as to move with it, and carries at its outer end a contact-finger 210, which is adapted to close an electrical circuit between two yielding contact-arms 211 and 212, which are interposed in a circuit which includes a battery 213 or other source of electrical energy and the solenoid 58 previously mentioned.

The testing-arm 205 is rocked with the bell-crank-lever 206 just after the push-rod 180 has completed its forward leaf-inserting movement under the urge of the spring 182, at which time the rear end of the push-rod will have moved out of the path of the testing-arm 205, so that the latter may be swung down with the bell-crank-lever 206 into the position indicated by the broken lines $b$ in Fig. 9. If, however, the push-rod 180 fails to move forward sufficiently far to clear itself from the path of the testing-arm, due to causes such as above enumerated, the testing-arm will strike the top of the push-rod and be swung upon its pivot 205$^a$, so as to assume the position shown by the broken lines $c$ in Fig. 9. In this position, the contact-finger 210 will engage the two contact-arms 211 and 212, so as to electrically connect them and cause a current to flow through the solenoid 58 for its energization, whereby the latch 56 is disengaged from the clutch-lever 54 and the spring 55 is permitted to act to disengage the clutch-member 53 from its complementary member 52, with the result that the rotation of the main-drive-shaft is stopped and hence all the parts driven by it.

While I have preferably embodied, in my improved machine, means for cutting leaves from a length of wire, I wish to have it understood that my invention is not limited to the employment of such means, since, obviously, the leaves might be cut prior to their introduction into my machine for being pointed and inserted into the lantern-pinion blank.

*Résumé of operation*

As before described, the lantern-pinion blanks of the character shown in Fig. 14 are mounted upon the upper reach of the chain-conveyor 20 either by hand or by a suitable automatic feeding device and are carried toward the machine in a step-by-step movement and presented beneath the yielding pick-up fingers 31 of the feed-arm 30 which grips them by their shaft 25 and transfers them to a position in line with the centering-post 62 and the gripping-tube 59. The gripping-tube now closes over the trunnion 24$^a$ of the pinion blank and grips the same.

The drill 63 now advances and bores a hole 93 through the collet 26 and a hole 94 partway through the collet 26$^a$, after which operation it retires and the gripping-tube 59 is turned one step to index the blank for another drilling operation, and this sequence of drilling and indexing is repeated until a complete annular series of holes 93 and 94 is formed in the pinion-blank.

When the pinion-blank has been provided, as just above described, with its annular series of aligned holes 93 and 94, the transfer-arm 98 is brought into action to cause its spring-fingers 99 to grip the shaft 25 of the drill pinion-blank and transfer the same to a position between the centering-post 97 and the centering-spindle 96. The centering-spindle now advances to firmly center the blank with capacity for step-by-step rotary movement which is effected by means of the oscillating indexing-arm 160 and its indexing-finger 161.

As the aligned holes 93 and 94 are successively brought into registration with the push-pin 179, the same advances to insert a leaf 95 (Fig. 16) thereinto, and after the withdrawal of the said push-pin, the staking-block 188 moves forward to cause its two staking-prongs 188$^a$ to upset the outer end of the hole 93 in the collet 26 so as to retain the just-inserted leaf in place. Each of the annular series of aligned holes 93 and 94 similarly receive a leaf 95 as the blank is rotated step-by-step by the indexing-arm 160.

The leaves 95 are brought into line with the push-pin 179 and the aligned holes 93 and 94 by means of the combined leaf cut-off and transfer slide 141, which reciprocates vertically. Previously to being cut off from the length of wire 134 and transferred as just described, the length of wire 134 is moved into engagement with the pointing-rolls 176 and retracted therefrom.

After each of the complementary aligned holes 93 and 94 of the pinion-blank has received a leaf 95, the centering-spindle 96 is retracted to release the now-completed lantern-pinion preparatory to the reception of another succeeding blank.

I claim:

1. A machine for making lantern-pinions, comprising means for holding a drilled pinion-blank; indexing means for the step-by-step indexing of the said blank; a wire-pointing mechanism; wire-feeding mechanism adapted to move the wire into engagement with the said pointing mechanism and to automatically retract it therefrom; means for cutting a leaf from the pointed end of the wire and aligning it with a previously-indexed opening in the pinion-blank; means for inserting the aligned leaf into the said pinion-blank; and a driving-member connected to the various means above mentioned for timing their sequence of operation.

2. A machine for making lantern-pinions, comprising means for holding a drilled pinion-blank; indexing means for the step-by-step indexing of the said blank; means for cutting a leaf from a length of wire and aligning it with a previously-drilled and indexed opening in the pinion-blank; leaf-inserting means for inserting the aligned leaf into the said pinion-blank; closing means for deforming the openings in the pinion-blank after the insertion of a leaf and the retraction of the said inserting-means; and a driving member connected to the various means above mentioned for timing their sequence of operation.

3. A machine for making lantern-pinions, comprising means for holding a drilled pinion-blank; indexing means for the step-by-step indexing of the said blank, including a yielding arm carrying a finger adapted to be successively entered into the openings in the said drilled pinion-blank; means for cutting a leaf from a length of wire and aligning it with a previously-drilled and indexed opening in the pinion-blank; leaf-inserting means for inserting the aligned leaf into the said pinion-blank; and a driving-member connected to the various means above mentioned for timing their sequence of operation.

4. A machine for making lantern-pinions, comprising means for holding a drilled pinion-blank; indexing means for the step-by-step indexing of the said blank, including a yielding-arm carrying a finger adapted to successively enter the openings in the said drilled pinion-blank; means for imparting an indexing movement to the said yielding-arm and for moving the said finger endwise to successively insert it into the openings in the pinion-blank and to withdraw it therefrom; means for cutting a leaf from a length of wire and aligning it with a previously-drilled and indexed opening in the pinion-blank; leaf-inserting means for inserting the aligned leaf into the said pinion-blank; and a driving-member connected to the various means above mentioned for timing their sequence of operation.

5. A machine for making lantern-pinions, comprising a chuck for holding a pinion-blank; a drill adjacent thereto; indexing means for effecting the step-by-step rotation of the said chuck for indexing the pinion-blank with respect to the said drill; means for automatically moving the said drill axially into the pinion-blank after each indexing movement of the said indexing means; holding means for receiving and holding a drilled pinion-blank; transfer-means for transferring the drilled pinion-blank from the said chuck to the said holding means; means for indexing the drilled pinion-blank; leaf-cutting means for cutting a leaf from a length of wire and aligning it with a previously-drilled and indexed opening in the pinion-blank; leaf-inserting means for inserting the aligned leaf into the said pinion-blank; and a driving-member connected to the various means above mentioned for timing their sequence of operation.

6. A machine for making lantern-pinions, comprising a chuck for holding a pinion-blank; a drill adjacent thereto; indexing means for effecting the step-by-step rotation of the said chuck for indexing the pinion-blank with respect to the said drill; means for automatically moving the said drill axially into the pinion-blank after each indexing movement of the said indexing means; holding means for receiving and holding a drilled pinion-blank; means for transferring the drilled pinion-blank from the said chuck to the said holding means; means for indexing the drilled pinion-blank; means for cutting a leaf from a length of wire and aligning it with the previously-drilled and indexed opening in the pinion-blank; leaf-inserting means for inserting the aligned leaf into the said pinion-blank; closing means for deforming the openings in the pinion-blank after the insertion of a leaf and the retraction of the said inserting means; and a driving member connected to the various means above mentioned for timing their sequence of operation.

7. A machine for making lantern-pinions, comprising holding means including a chuck-member and a complementary centering-member; means for moving one of the said members with respect to the other for holding a pinion-blank; a drill adjacent the said members; indexing means for effecting the step-by-step rotation of the said chuck-member for indexing the pinion-blank with respect to the said drill; means for automatically moving the said drill axially into the pinion-blank after each indexing movement of the said indexing means; holding means for receiving and holding a drilled pinion-blank; means for transferring the drilled pinion-blank from the first-mentioned holding-means to the last-mentioned holding-means; means for indexing the drilled pinion-blank; means for cutting a leaf from a length of wire and aligning it with the previously-drilled and indexed opening in the pinion-blank; leaf-inserting means for inserting the aligned leaf into the said pinion-blank; and a driving member connected to the various means above mentioned for timing their sequence of operation.

8. A machine for making lantern-pinions, comprising a chuck for holding a pinion-blank; a drill adjacent thereto; indexing means for effecting the step-by-step rotation of the said chuck for indexing the pinion-blank with respect to the said drill; means for automatically moving the said drill axially into the pinion-blank after each indexing movement of the said indexing means; holding means for receiving and holding a drilled pinion-blank, including a centering-post formed with a pinion-receiving socket; a transfer-arm for transferring the drilled pinion-blank from the said chuck to the said holding means; actuating mechanism for imparting both swinging and lateral movement to the said transfer-arm, whereby the drilled pinion-blank is first transferred and then inserted into the said centering-post; means for indexing the drilled pinion-blank; means for cutting a leaf from a length of wire and aligning it with the previously-drilled and indexed opening in the pinion-blank; leaf-inserting means for inserting the aligned leaf into the said pinion-blank; and a driving-member connected to the various means above mentioned for timing their sequence of operation.

9. A machine for making lantern-pinions, comprising means for holding a drilled pinion-blank; indexing means for the step-by-step indexing of the said blank; means for cutting a leaf from a length of wire and aligning it with a previously-drilled and indexed opening in the pinion-blank; leaf-inserting means for inserting the aligned leaf into the said pinion-blank; a driving-member connected to the various means above mentioned for timing their sequence of operation; two complementary mutually-engaging clutch-members for coupling said driving-member with a source of power; and a testing-finger for causing the disengagement of the said clutch-members when the aforesaid leaf-inserting means fails to advance its normal leaf-inserting distance.

10. A machine for making lantern-pinions, comprising means for holding a drilled pinion-blank; indexing means for the step-by-step indexing of the said blank; means for cutting a leaf from a length of wire and aligning it with a previously-drilled and indexed opening in the pinion-blank; leaf-inserting means for inserting the aligned leaf into the said pinion-blank; a driving-member connected to the various means above mentioned for timing their sequence of operation; two complementary mutually-engaging clutch-members for coupling the said driving-member with a source of power; yielding-means tending to disengage the said clutch-members; a latch for normally holding the said clutch-members in engagement; and a testing-finger for causing the actuation of the said latch when the aforesaid leaf-inserting means fails to advance its normal leaf-inserting distance, whereby the said yielding means is permitted to assert itself for the disengagement of the said clutch-members.

11. A machine for making lantern-pinions, comprising means for holding a drilled pinion-blank; indexing means for the step-by-step indexing of the said blank; means for cutting a leaf from a length of wire and aligning it with a previously-drilled and indexed opening in the pinion-blank; leaf-inserting means for inserting the aligned leaf into the said pinion-blank; a driving-member connected to the various means above mentioned for timing their sequence of operation; two complementary mutually-engaging clutch-members for coupling the said driving-member with a source of power; yielding means tending to disengage the said clutch-members; a latch for normally holding the said clutch-members in engagement; an electro-magnet for actuating the said latch; an electrical circuit for the said magnet; and a testing-finger for closing the said circuit when the aforesaid leaf-inserting means fails to advance its normal leaf-inserting distance, whereby the said yielding means is permitted to assert itself for the disengagement of the said clutch-members.

12. A machine for making lantern-pinions, comprising a chuck for holding a pinion-blank; a drill adjacent thereto; indexing means for effecting the step-by-step rotation of the said chuck for indexing the pinion-blank with respect to the said drill; means for automatically moving the said drill axially into the pinion-blank after each indexing movement of the said indexing means; holding means for receiving and holding a drilled pinion-blank; transfer means for transferring the drilled pinion-blank from the said chuck to the said holding means; means for indexing the drilled pinion-blank; leaf-cutting means for cutting a leaf from a length of wire and aligning it with a previously-drilled and indexed opening in the pinion-blank; leaf-inserting means for inserting the aligned leaf into the said pinion-blank; a driving-member connected to the various means above mentioned for timing their sequence of operation; and an automatically-operated clutch-member for temporarily disconnecting the said leaf-cutting and leaf-inserting means from the said driving-means, whereby their functioning is suspended while the said transfer-means is in action.

13. A machine for making lantern-pinions, comprising means for holding and indexing a drilled pinion-blank; a leaf-pointing mechanism; a feeding-and-retracting mechanism adapted to move one end of a leaf into engagement with the said pointing mechanism and to retract it therefrom; leaf-inserting means for automatically inserting a pointed leaf into a previously-indexed opening in the pinion-blank; and a driving member connected to the various means above mentioned for timing their sequence of operation.

14. A machine for making lantern-pinions, comprising means for holding and indexing a drilled pinion-blank; a leaf-pointing mechanism; a feeding-and-retracting mechanism adapted to move one end of a leaf into engagement with the said pointing mechanism and to retract it therefrom; leaf-inserting means for automatically inserting a pointed leaf into a previously-indexed opening in the pinion-blank; closing means for deforming the openings in the pinion-blank after the insertion of a leaf and the retraction of the said leaf-inserting means; and a driving member connected to the various means above mentioned for timing their sequence of operation.

15. A machine for making lantern-pinions, comprising means for holding and indexing a drilled pinion-blank; a leaf-pointing mechanism; a feeding-and-retracting mechanism adapted to move one end of a leaf into engagement with the said pointing mechanism and to retract it therefrom; leaf-inserting means for automatically inserting a pointed leaf into a previously-indexed opening in the pinion-blank; closing means for deforming the openings in the pinion-blank after the insertion of a leaf and the retraction of the said leaf-inserting means; an automatically-positioned anvil for supporting the pinion-blank during the action of the said closing means; and a driving member connected to the various means above mentioned for timing their sequence of operation.

16. A machine for making lantern-pinions, comprising means for holding a drilled pinion-blank; indexing means for the step-by-step indexing of the said blank, including a yielding arm carrying a finger adapted to be be successively entered into the openings in the said drilled pinion-blank; leaf-inserting means for inserting a leaf into the said pinion-blank; and a driving member connected to the various means above mentioned for timing their sequence of operation.

17. A machine for making lantern-pinions, comprising means for holding a drilled pinion-blank; indexing-means for the step-by-step rotation of the said blank; a wire-pointing mechanism for pointing the inner end of a length of wire; means for cutting a leaf from the inner pointed end of the said length of wire and aligning it with a previously-indexed opening in the said pinion-blank; leaf-inserting means for inserting the aligned leaf into the said pinion-blank; automatic means operable alternately with the said indexing-means for actuating the said leaf-inserting means; and a driving-member connected to the various means above mentioned for timing their sequence of operation.

18. In a machine of the character described, means at one station for drilling pinion blanks, means at another station for filling the drilled blanks with wires, means for moving the pinion blanks from the drilling station to the filling station, and means for indexing the pinion blanks at each of said stations.

19. In a machine of the character described, a drill at one station, means at another station for filling the drilled pinion blanks with wires, means for moving the pinion blanks successively from drilling to filling stations, means for indexing the blanks about their own axes at each of said stations, means for reciprocating said drill each time a pinion blank is indexed at the drilling station, and means for operating said filling means each time a blank is indexed at said filling station.

20. In a machine of the character described, a plurality of stations means for moving pinion blanks from one station to another, means at one of said stations for drilling the pinion blanks, means at another of said stations for filling the drilled blanks with wires, means for delivering pinion blanks to the drilling station, means for indexing the blanks at each of said stations, and means for effecting operation of said delivering, drilling and filling means in timed relation to said blank moving means and indexing means.

21. In a machine of the character described, a plurality of stations means for moving pinion blanks from a drilling station to a filling station, means at each of said stations for indexing the blanks about their own axes, means at the drilling station for drilling the blanks, and means at the filling station for delivering wire lengths into alignment with and inserting the same into the drilled holes of the pinion blanks at that station.

22. In a machine of the character described, a plurality of stations means for moving pinion blanks from a drilling station to a filling station, means for indexing the pinion blanks about their own axes at each of said stations, a drill at the drilling station for successively drilling holes in the pinion blanks at that station, means at the filling station for inserting wire lengths into the drilled holes of the pinion blanks at that station, means for severing and delivering wire lengths to said inserting means, and means for feeding the wire to said severing means.

23. In a machine of the character described, a plurality of stations means for moving pinion blanks from a drilling station to a filling station, means for indexing said blanks about their own axes at each of said stations, means for delivering pinion blanks one by one to said drilling station, means at the drilling station for drilling the pinion blanks, means at the filling station for severing, delivering and inserting a wire length into the drilled pinion blanks each time the latter are indexed, and means for operating said indexing means, blank feeding means, drilling means and filling means in timed relation to said moving means.

24. The herein described method of drilling and filling clock pinion blanks, which consists in successively moving the pinion blanks from a drilling station to a filling station, drilling holes one by one in the pinion blanks at the drilling station, and filling the holes with wires one by one at the filling station.

25. The herein described method of drilling and filling clock pinion blanks, which consists in moving the pinion blanks from a drilling station to a filling station, indexing the blanks about their own axes at each of said stations, successively drilling holes in the pinion blanks at the drilling station, and filling the drilled holes with wires at the filling station.

26. The herein described method, which consists in moving pinion blanks successively to several stations, drilling the blanks at one of the stations, filling the blanks with wires at another station, indexing the blanks at the drilling station and the filling station, and fastening the wires in place at another station.

In testimony whereof, I have signed this specification.

FREDERICK FRANZ.